United States Patent
Spinelli et al.

(10) Patent No.: US 12,281,747 B2
(45) Date of Patent: Apr. 22, 2025

(54) BIPOD SUPPORT FOR HANDHELD DRAIN CLEANING MACHINE

(71) Applicant: Ridge Tool Company, Elyria, OH (US)

(72) Inventors: Emily Jo Spinelli, Cincinnati, OH (US); Kaylin Jacobsen, North Royalton, OH (US); Sarah Michaud, Mount Vernon, OH (US); Jeffrey Szucs, Columbia Station, OH (US); Alex M. Cole, Columbia Station, OH (US); Michael J. Rutkowski, North Royalton, OH (US); Nicholas Christopher Mavros, Columbia Station, OH (US); Jacob Schneider, Elyria, OH (US)

(73) Assignee: Ridge Tool Company, Elyria, OH (US)

( * ) Notice: Subject to any disclaimer, the term of this patent is extended or adjusted under 35 U.S.C. 154(b) by 0 days.

(21) Appl. No.: 18/511,754

(22) Filed: Nov. 16, 2023

(65) Prior Publication Data
US 2024/0084959 A1    Mar. 14, 2024

Related U.S. Application Data

(62) Division of application No. 16/849,452, filed on Apr. 15, 2020, now abandoned.
(Continued)

(51) Int. Cl.
  *F16M 13/00* (2006.01)
  *B08B 9/043* (2006.01)
  *B08B 13/00* (2006.01)

(52) U.S. Cl.
  CPC .......... *F16M 13/00* (2013.01); *B08B 9/0436* (2013.01); *B08B 13/00* (2013.01)

(58) Field of Classification Search
  CPC ...... F16M 13/00; B08B 9/0436; B08B 13/00; E03C 1/302
  (Continued)

(56) References Cited

U.S. PATENT DOCUMENTS

| | | | | |
|---|---|---|---|---|
| 1,382,409 A | * | 6/1921 | Butler | F41A 23/08 248/166 |
| 1,524,973 A | * | 2/1925 | Hazelton | F41A 23/08 248/168 |

(Continued)

FOREIGN PATENT DOCUMENTS

| | | |
|---|---|---|
| CN | 108571043 | 9/2018 |
| DE | 202010012222 U1 | 12/2010 |

OTHER PUBLICATIONS

International Search Report dated Jul. 9, 2020; Application No. PCT/US20/28210; 18 pages.
(Continued)

*Primary Examiner* — Muhammad Ijaz
(74) *Attorney, Agent, or Firm* — Erik J. Overberger; RANKIN, HILL & CLARK LLP

(57) ABSTRACT

A bipod support for a drain cleaning machine is described. The bipod support includes a base, a plurality of legs, a retaining member, and a latch. The retaining member and latch are configured to engage and secure the drain cleaning machine to the bipod support. The bipod support enables rocking movement of the drain cleaning machine while supporting the weight of the machine. Also described are related methods of use of the bipod support.

19 Claims, 14 Drawing Sheets

Related U.S. Application Data

(60) Provisional application No. 62/834,788, filed on Apr. 16, 2019.

(58) Field of Classification Search
USPC .................................................... 248/125.8
See application file for complete search history.

(56) References Cited

U.S. PATENT DOCUMENTS

| | | | | |
|---|---|---|---|---|
| 1,807,549 | A * | 5/1931 | Reber | B65H 75/40 |
| | | | | 242/399 |
| 2,188,393 | A | 1/1940 | Mueller | |
| 2,278,067 | A | 3/1942 | Emery | |
| 2,318,172 | A | 5/1943 | Long | |
| 2,420,267 | A * | 5/1947 | Sefried | F41A 23/08 |
| | | | | 42/76.02 |
| 2,940,099 | A * | 6/1960 | Kollmann | E03F 9/005 |
| | | | | 279/57 |
| 4,916,772 | A * | 4/1990 | Russell | E03F 9/005 |
| | | | | 15/104.33 |
| 6,763,627 | B1 * | 7/2004 | Kaempe | F41A 23/10 |
| | | | | 89/37.04 |
| 6,829,857 | B1 * | 12/2004 | Houtsma | F41A 23/10 |
| | | | | 89/37.04 |
| 7,478,496 | B2 * | 1/2009 | Bender | F41A 23/10 |
| | | | | 248/176.1 |
| 7,571,563 | B2 * | 8/2009 | Peterson | F41A 23/08 |
| | | | | 248/165 |
| 8,596,597 | B1 * | 12/2013 | Spicer | F16M 11/38 |
| | | | | 248/81 |
| 8,863,430 | B2 * | 10/2014 | Poling | F41A 23/10 |
| | | | | 248/163.1 |
| 9,234,342 | B1 * | 1/2016 | Beesley | E03F 9/005 |
| 9,803,947 | B2 * | 10/2017 | Poling | F41A 23/10 |
| 10,443,225 | B2 * | 10/2019 | Hoyt | E03C 1/302 |
| 10,690,434 | B1 * | 6/2020 | Ding | F41A 23/14 |
| 2005/0188596 | A1 * | 9/2005 | Wygant | F41A 23/08 |
| | | | | 42/94 |
| 2005/0274751 | A1 * | 12/2005 | Plumley | B63C 11/02 |
| | | | | 223/85 |
| 2006/0278797 | A1 * | 12/2006 | Keng | F16M 11/26 |
| | | | | 248/440.1 |
| 2009/0126250 | A1 | 5/2009 | Keng | |
| 2010/0084524 | A1 | 4/2010 | Faifer | |
| 2011/0271578 | A1 * | 11/2011 | Karagias | F41G 11/003 |
| | | | | 42/124 |
| 2015/0204479 | A1 * | 7/2015 | Bryant | F16M 11/16 |
| | | | | 248/676 |
| 2017/0266702 | A1 * | 9/2017 | Cole | E03C 1/302 |
| 2018/0016776 | A1 * | 1/2018 | Stoneback | E03F 9/005 |

OTHER PUBLICATIONS

K-45 Sink Machine; Jun. 29, 2020; 14 pages.
Notification Of Transmittal Of The International Preliminary Report on Patentability dated Mar. 23, 2021; Application No. PCT/US20/28210; 10 pages.

* cited by examiner

BIPOD SUPPORT FOR HANDHELD DRAIN CLEANING MACHINE

CROSS REFERENCES TO RELATED APPLICATIONS

This application claims priority from and is a divisional of U.S. nonprovisional application Ser. No. 16/849,452 filed Apr. 15, 2020, which claims priority from U.S. provisional application Ser. No. 62/834,788 filed on Apr. 16, 2019.

FIELD

The present subject matter relates to drain cleaning equipment and particularly, supports for handheld drain cleaning machines. The present subject matter also relates to methods of clearing blockages in drains by use of the supports and methods.

BACKGROUND

Handheld drain cleaning machines are well known. A particularly well made and rugged handheld drain cleaning machine, preferred by professionals such as plumbers and other trades people, is commercially available and known as a RIDGID K-45 Sink Machine, manufactured and sold by the Ridge Tool Company.

Yet another example of a handheld drain cleaning machine is disclosed in U.S. Pat. No. 9,234,342 to Beesley et al. ("the Beesley patent"). The handheld drain cleaning machine disclosed in the Beesley patent is of the type that employs a flexible snake that can be inserted into a waste line and rotated to remove a blockage. For this purpose, the Beesley patent discloses a drum in which the snake is coiled and a guide tube extending from a central portion of the drum, from which the snake can be extended and retracted. The Beesley patent also discloses an electric motor, coupled to the drum, to provide rotational movement to the drum and the snake when AC current is provided to the motor through a user-activated switch located within a handle grip. The handle grip, secured to the electric motor, is positioned directly above the center of gravity of the machine. In addition, an extendable support is also secured to the electric motor and positioned so that the foot is directly beneath the center of gravity of the handheld machine.

While the device of the Beesley patent was designed to reduce the fatigue often encountered by professionals such as plumbers and other trades people who spend more time than expected unclogging blocked drains, one aspect of the fatigue problem the Beesley patent attempted to solve was to provide a one-legged support structure (also called a monopod) to bear the weight of a handheld drain cleaning machine. However, the Beesley patent did not solve another aspect of the fatigue problem often encountered by professionals, which is the fatigue experienced by professionals who must periodically advance an operative end of the snake into a clogged drain, and immediately thereafter, retract the operative end of the snake from the drain, in order to work free any blockage (also referred to as "clogs") present in the drain, for clearing the drain.

This aspect of the fatigue problem, which the Beesley patent did not solve, stems from the fact that periodic advancement and retraction of a typical drain cleaning machine, the weight of which is supported on a monopod, still requires a user to physically move a drain cleaning machine-and-monopod assembly, so that the operative end of the snake is extended into, and soon thereafter retracted from, a drain opening. Pivoting a cleaning machine-and-monopod assembly, on the end of a leg that is on a floor or other support surface, will not reduce fatigue, since such pivoting of the assembly would not keep the operative end of the snake on a substantially horizontal trajectory. This is due to the fact that the operative end of the snake would follow an arcuate trajectory, whenever the assembly is pivoted on its leg toward the drain opening. In view of these and other concerns, a need remains in the art for a device and related method of use for reducing operator fatigue associated with operating handheld drain cleaning machines.

SUMMARY

The difficulties and drawbacks associated with previous approaches are addressed in the present subject matter as follows.

In one aspect, the present subject matter provides in combination with a drain cleaning machine, a bipod support removably secured to the drain cleaning machine. The drain cleaning machine comprises a housing defining a hollow forward end portion and a preselected exterior surface configuration for the forward end portion of the housing. The drain cleaning machine also comprises a drum rotatable about an axis. The drain cleaning machine further comprises a cable including an operative end portion that is extendable from and retractable into the drum. The bipod support comprises a base configured to support the drain cleaning machine. The bipod support also comprises a pair of legs, wherein each leg is pivotally connected to the base for moving the base between a first position spaced from a drain and a second position closer to the drain than the first position. The drain cleaning machine, when secured to the base, is movable between the first and second positions relative to the drain, whereupon the operative end portion of the cable, disposed in the drain, is extended and retracted relative to the drain, when the base is moved between the first and second positions.

In another aspect, the present subject matter provides a bipod support comprising a base configured to support a drain cleaning machine. The base includes a recessed support surface. The bipod support also comprises a pair of legs, each leg connected to the base. The bipod support also comprises a retaining member connected to the base. The retaining member is positionable between a closed position in which access to the recessed support surface is precluded and an open position in which access to the recessed support surface is enabled. The bipod support further comprises a latch having a first end portion and a second end portion, wherein one of the first end portion and the second end portion is secured to the base, and the other of the first end portion and the second end portion is secured to the retaining member.

In yet another aspect, the present subject matter provides a method of administering a drain cleaning cable in a drain. The method comprises providing a bipod support including, (i) a base configured to support a drain cleaning machine, the base including a recessed support surface, (ii) a pair of legs, each leg connected to the base, (iii) a retaining member connected to the base, the retaining member positionable between a closed position in which access to the recessed support surface is precluded and an open position in which access to the recessed support surface is enabled, and (iv) a latch having a first end portion and a second end portion, wherein one of the first end portion and the second end portion is secured to the base, and the other of the first end portion and the second end portion is secured to the retaining member. The method also comprises positioning a drain cleaning machine including a drain cleaning cable, on the base. The method additionally comprises positioning the retaining member to the closed position such that the drain cleaning machine is secured to the base. The method further comprises extending the drain cleaning cable into a drain. And, the method also comprises moving the bipod support, the drain cleaning machine, and the drain cleaning cable extended therefrom between a first position and a second position, whereby, the drain cleaning cable is extended and retracted relative to the drain.

In still another aspect, the present subject matter provides a bipod support comprising a base configured to support a drain cleaning machine, the base including a recessed support surface. The bipod support also comprises a pair of legs, each leg pivotally connected to the base such that each leg can be positioned to extend transverse to a plane of the base. Each leg includes a compression spring and is configured to vary in length depending upon an amount of axial force applied to the leg. The bipod support further comprises a retaining member connected to the base. The retaining member is positionable between a closed position in which access to the recessed support surface is precluded and an open position in which access to the recessed support surface is enabled. The bipod support also comprises a latch having a first end portion and a second end portion, wherein one of the first end portion and the second end portion is secured to the base, and the other of the first end portion and the second end portion is secured to the retaining member.

In yet another aspect, the present subject matter provides a method of administering a drain cleaning cable in a drain. The method comprises providing a bipod support including, (i) a base configured to support a drain cleaning machine, the base including a recessed support surface, (ii) a pair of legs, each leg pivotally connected to the base, each leg including a compression spring and being configured to vary in length depending upon an amount of axial force applied to the leg, (iii) a retaining member connected to the base, the retaining member positionable between a closed position in which access to the recessed support surface is precluded and an open position in which access to the recessed support surface is enabled, and (iv) a latch having a first end portion and a second end portion, wherein one of the first end portion and the second end portion is secured to the base, and the other of the first end portion and the second end portion is secured to the retaining member. The method also comprises positioning a drain cleaning machine including a drain cleaning cable, on the base. The method further comprises positioning the retaining member to the closed position such that the drain cleaning machine is secured to the base. The method also comprises extending the drain cleaning cable into a drain. The method additionally comprises positioning and securing the pair of legs to extend in a direction parallel to an axis of the drain cleaning cable as taken relative to a distal end of the drain cleaning machine. And, the method comprises moving the bipod support, the drain cleaning machine, and the drain cleaning cable extended therefrom between a first position and a second position, whereby, the drain cleaning cable is extended and retracted relative to the drain.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The bipod support of the present subject matter, with two legs connected to a base that securely holds and supports the weight of a typical handheld drain cleaning machine, remedies the fatigue problem not solved by the Beesley patent. In addition, the bipod support of the present subject matter provides lateral restriction of movement of an assembly of the bipod support, a drain cleaning machine, and cable extending therefrom, thereby relieving the user from having to balance the bipod support in lateral directions.

In particular, the legs of the bipod support can be rotated, pivoted, and/or otherwise positioned and secured at any angle a user chooses, relative to an axis the snake must linearly travel in order to enter, unrestrictedly, an opening of a drain to be cleared of any blockage.

The present subject matter also provides various methods of use of the bipod support in which a user may "rock" a cleaning machine-and-bipod assembly (also called a "combination"), forward and backward, to thereby create a push-and-pull motion, along a substantially horizontally-disposed path-of-travel relative to the opening of a drain to be cleared.

I. Bipod Support

Figure 5:
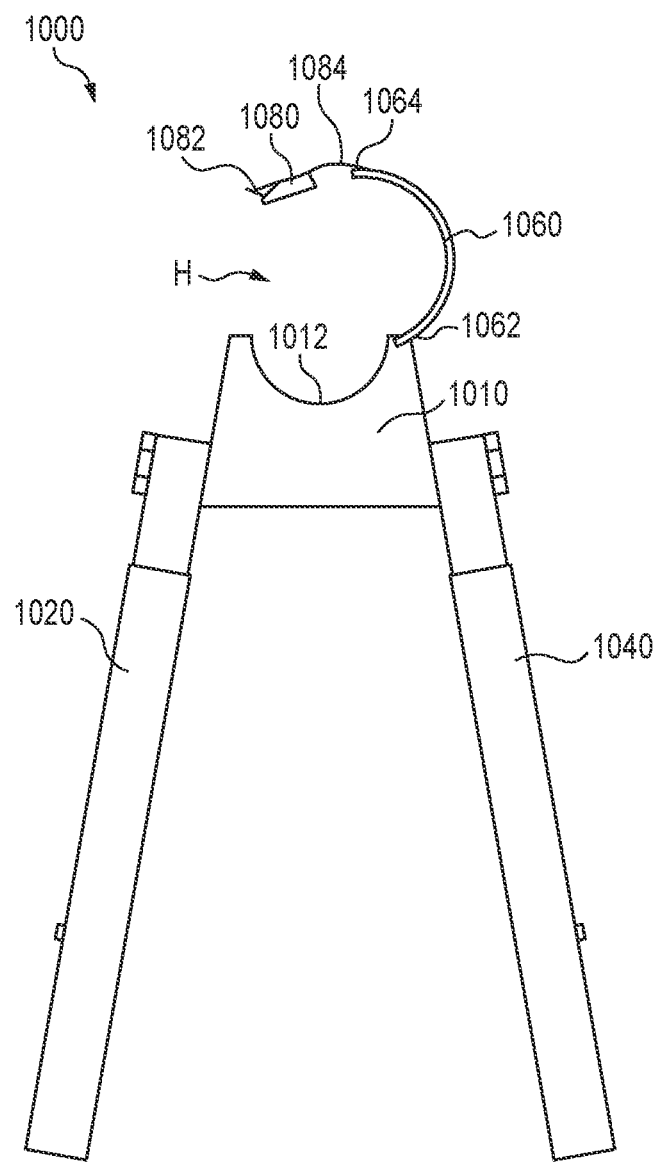
FIGS. 5 and 6 illustrate positioning versions of a retaining member of the bipod support to an open position.
Figure 6:
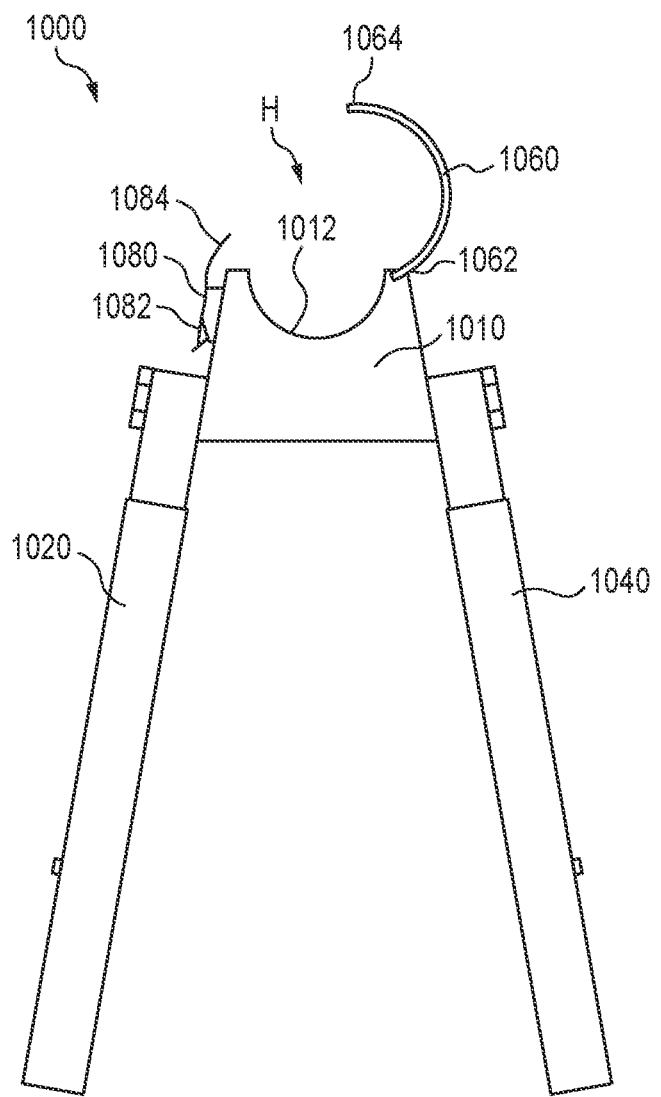

FIGS. 1-4 illustrate an embodiment of a bipod support 1000 in accordance with the present subject matter. The bipod support 1000 generally comprises a base 1010 configured to support a drain cleaning machine or component thereof. The bipod support 1000 also comprises a pair of legs 1020, 1040 affixed or otherwise connected to the base 1010. In many versions, the legs 1020, 1040 are each pivotally connected to the base 1010 as described in greater detail herein. The bipod support 1000 also comprises a retaining member which in many versions is in the form of a curved hook 1060, attached or otherwise secured to the base 1010. The curved hook 1060 defines a first end portion 1062 pivotally or hingedly connected to the base 1010. The bipod support 1000 also comprises a bi-ended latch 1080 having opposite end portions 1082 and 1084. Specifically and in one version of the bipod support, a first end portion 1082 of the latch 1080 is removably secured to the base 1010. A second end portion 1084 of the latch 1080 is fixed or secured to a second end portion 1064 of the curved hook 1060. In another version of the bipod support, the first end portion 1082 of the latch 1080 is fixed or secured to the base 1010, and the second end portion 1084 of the latch 1080 is removably secured to the second end portion 1064 of the curved hook 1060. The latch 1080 is removably secured to either the base 1010 or to the retaining member 1060. Typically, if the latch 1080 is removably secured to the base 1010 as shown in FIG. 5, then the latch 1080 is connected to the retaining member 1060 and movable therewith. If the latch 1080 is removably secured to the retaining member 1060 as shown in FIG. 6, then the latch 1080 is connected to the base 1010.

The retaining member or curved hook 1060 is pivotally or hingedly connected to the base 1010. This enables movement of the retaining member 1060 relative to the base 1010, but maintains connection between the components. Generally, the retaining member 1060 is positionable between a closed position as shown in FIGS. 1-4 in which radial access by a drain cleaning machine to the recessed support surface 1012 is blocked or otherwise precluded; and an open position in which radial access to the recessed support surface 1012 is enabled. FIGS. 5 and 6 illustrate positioning of the retaining member or curved hook 1060 to the open position in which radial access to the recessed support surface 1012 by a drain cleaning machine, is enabled. Arrow H illustrates radial access to the recessed support surface 1012, as a result of positioning the retaining member or curved hook 1060 to the open position. FIGS. 5 and 6 illustrate the two previously described representative versions of the latch 1080 and retaining member or curved hook 1060 in which the latch 1080 is removably secured to the base 1010 or the retaining member or curved hook 1060, respectively.

In many versions, the retaining member or curved hook 1060 and the base 1010 are configured to circumferentially engage an exterior surface of a housing of a drain cleaning machine, and particularly a forward end portion of the housing when the retaining member or curved hook 1060 is secured to the base 1010 via the latch 1080. In certain embodiments, the base 1010 includes a recessed support surface 1012. Typically, the recessed support surface 1012 is directed away from the legs 1020, 1040. The recessed support surface 1012 may exhibit a variety of shapes and/or profiles, but in many versions the recessed support surface 1012 exhibits an arcuate profile. In a particular embodiment, the recessed support surface 1012 exhibits a circumferential profile or substantially so.

As previously noted, each leg 1020, 1040 is pivotally connected to the base 1010. This enables each leg 1020, 1040 to be pivoted about its point of connection to the base 1010. Generally, components such as fasteners are used to attach each leg 1020, 1040 to the base 1010, while also enabling each leg to pivotally move about the point of attachment. The present subject matter also includes configurations in which each leg 1020, 1040 is selectively positionable to a particular orientation relative to the base 1010 and then can be rigidly secured to the base at that desired position. Fasteners can be used to secure or affix each leg 1020, 1040 at a particular orientation relative to the base 1010. Typically, such components can also function as axle(s) or pin(s) that enable or promote such movement of the legs 1020, 1040 relative to the base 1010. In the embodiment depicted in FIGS. 1-4, threaded fasteners are used for such connection. Specifically, a first threaded fastener 1021 is used to pivotally connect the leg 1020 to the base 1010, and a second threaded fastener 1041 is used to pivotally connect the leg 1040 to the base 1010. This configuration enables each leg 1020, 1040 to pivotally move relative to the base 1010 while also maintaining affixment of the legs 1020, 1040 to the base 1010. In addition, and as previously noted, the threaded fasteners 1021, 1041 can be configured such that they enable selective positioning of each leg relative to the base 1010 upon loosening of the fastener(s) 1021, 1041. And, upon positioning the legs 1020, 1040 to a desired orientation to the base 1010, the threaded fasteners 1021, 1041 are tightened to thereby rigidly secure the legs 1020, 1040 to the base 1010.

Upon placement of the drain cleaning machine on the bipod support 1000 and securing the drain cleaning machine to the base 1010, the resulting assembly of drain cleaning machine and bipod support, is movable between a plurality of positions. More specifically, the resulting assembly is movable between a first position and a second position relative to a drain such as may be receiving a drain cleaning cable extended from the drain cleaning machine. Generally, the first and second positions differ from each other in their distance to the drain. Thus, by moving the resulting assembly between these two positions, a user can impart axial motion to a drain cleaning cable extending from the drain cleaning machine. The present subject matter also includes moving the resulting assembly to additional and/or different positions relative to the drain of interest. These aspects are described in greater detail herein. In addition and as previously noted, the bipod support provides lateral restriction of movement such that a user does not have to balance the bipod support with regard to unintended lateral movement.

In many embodiments, the legs of the bipod support include provisions that enable adjustment of the length of each leg. This enables adjustment in height of the base of the bipod support relative to a surface on which the bipod support is positioned. The length adjustment provisions of each leg are not limited to any particular type, assembly, or configuration. For example, the length adjustment provisions can be in the form of telescoping members in which one member includes a plurality of spaced apart apertures, and another member includes an extendable detent that can be selectively positioned in one of the apertures as a length adjustment of a leg is made. FIGS. 1-4 illustrate an example of this type of length adjustment provision. Specifically, leg 1020 includes an inner leg member 1022 that is telescopically received in an outer leg member 1024. The outer leg member 1024 defines a plurality of apertures 1026. The inner leg member 1022 includes a detent member 1028 which is sized and configured to extend into an aperture 1026, and thereby engage the leg members 1022, 1024 in a fixed length relationship with one another. Typically, the detent member is biased to extend outward and thereby promote engagement into an aperture. The leg 1040 includes a corresponding length adjustment provision. The present subject matter includes a wide array of length adjusting provisions for the legs 1020, 1040 such as but not limited to a cam member engageable with a sliding leg such as described in U.S. Pat. No. 6,598,841; telescoping leg assemblies with frictionally engageable ring members as described in U.S. Pat. No. 2,229,475; telescoping assemblies with finger(s) frictionally engaging members of the assembly as described in U.S. Pat. No. 4,632,597; bearing slide members for adjusting heights of telescoping legs as described in U.S. Pat. No. 6,682,030; and pinned telescoping legs as in U.S. Pat. No. 4,756,384. Furthermore, the length adjusting provisions may be in the form of hinge/clamping shaft collar(s), telescoping legs adjustable by a threaded fastener, removable and interchangeable legs of different heights, and other assemblies.

Figure 7:
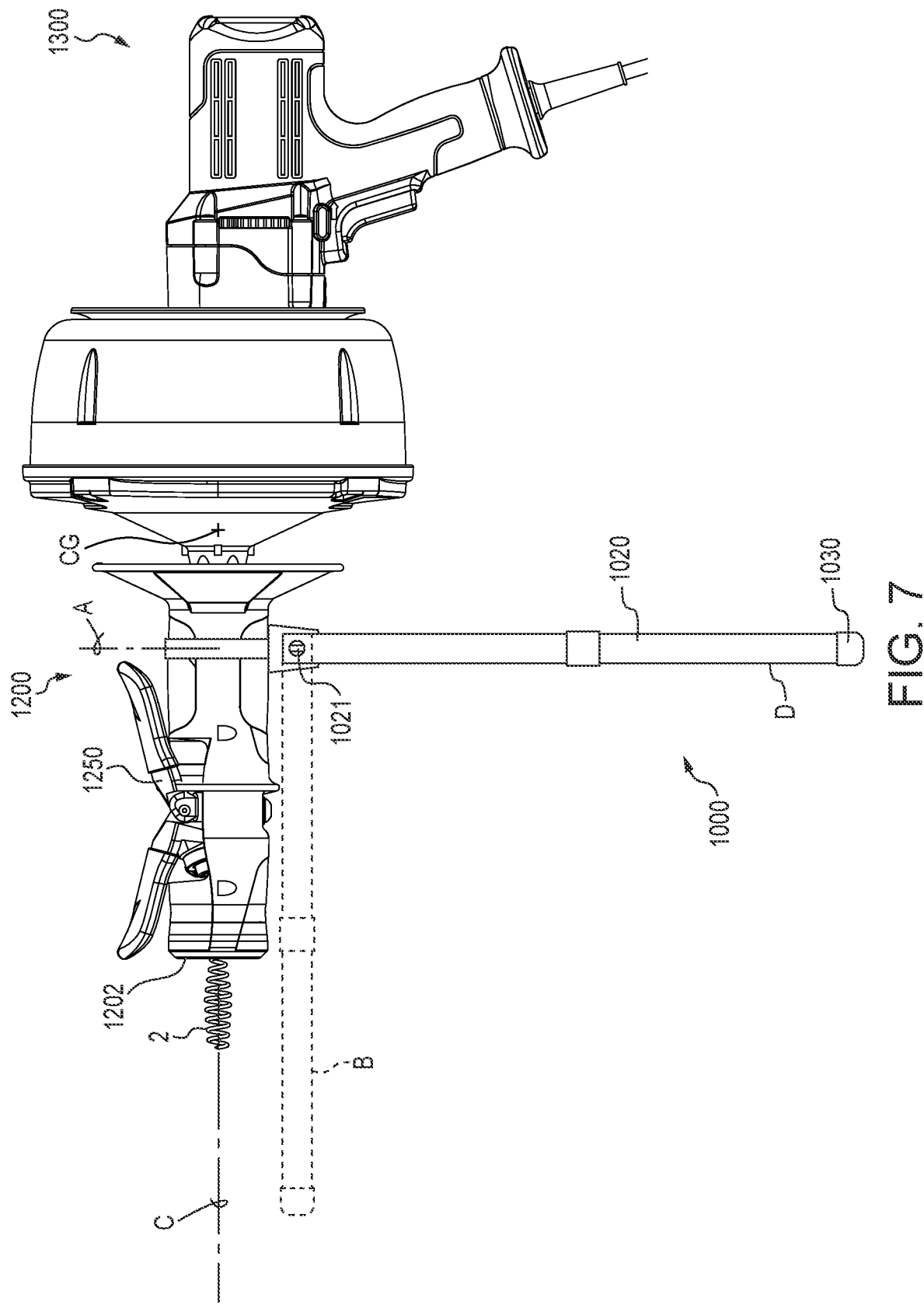
FIG. 7 illustrates another embodiment of a bipod support in use with a drain cleaning machine in accordance with the present subject matter.

FIG. 7 illustrates another embodiment of a bipod support 1000 in use with a drain cleaning machine 1200 in accordance with the present subject matter. FIG. 7 illustrates the drain cleaning machine 1200 powered by an electrically operated drill 1300. FIG. 7 also illustrates another aspect of the bipod support 1000 relating to pivotal attachment of the legs 1020, 1040 to the base 1010 of the bipod support 1000. The legs 1020, 1040 are attached to the base 1010 such that the legs are positionable to a plurality of positions relative to the base 1010, such as a position D depicted in FIG. 7. This position D is generally transverse to an axis C of a drain cleaning cable 2 as taken proximate a distal end 1202 of the drain cleaning machine 1200. In many versions of the bipod support, this position D is also parallel or co-extensive position with the plane of the base 1010, denoted as plane A in FIG. 7. The legs 1020, 1040 are also positionable to a transverse position B in which the legs 1020, 1040 extend parallel with the axis C of the drain cleaning cable 2 and perpendicular to the noted plane A. It will be understood that in many versions of the bipod support, the legs 1020, 1040 are positionable to other positions than those shown in FIG. 7. The legs 1020, 1040 are positionable by pivoting each leg about its point of attachment with the base. As noted, in certain versions of the bipod support this may include loosening the fasteners 1021, 1041, respectively. As will be understood, once a leg or both legs are positioned to a desired position such as position B in FIG. 7, the leg(s) can be retained in that position by tightening the respective fastener(s) 1021 and/or 1041. It is also contemplated that detent(s) or other like assemblies can be used in association with the legs 1020, 1040 such that upon positioning the legs 1020, 1040 to a desired orientation relative to the base 1010, such as position B depicted in FIG. 7, the detent(s) retain the legs in that particular orientation until released by a user. Furthermore, it is also contemplated that a key connection configuration can be used to connect each leg 1020, 1040 to the base 1010. For example, the legs 1020, 1040 can each be keyed into a shaft, and which shaft pivots in a mounting receptacle of the base 1010. A wide array of mounting arrangements between the legs 1020, 1040 and the base 1010 can be used.

FIG. 7 illustrates another aspect of many embodiments of the bipod support of the present subject matter. The bipod support 1000 and its use with a drain cleaning machine 1200 is such that upon positioning and securing the drain cleaning machine 1200 with the bipod support 1000, the bipod support 1000 is located frontwardly of a center of gravity of the drain cleaning machine 1200. FIG. 7 illustrates a typical center of gravity CG of the drain cleaning machine 1200. Thus, as will be understood, upon such positioning and securing of the drain cleaning machine 1200 with the bipod support 1000, the bipod support 1000 is located between the center of gravity CG of the drain cleaning machine 1200 and a distal end 1202 of the drain cleaning machine 1200 or a component thereof. However, it will be understood that the present subject matter is not limited to this aspect. And so, the present subject matter includes bipod supports configured such that the bipod supports are used with drain cleaning machines at other locations such as generally underneath a center of gravity of the drain cleaning machine or rearward of the center of gravity of the drain cleaning machine.

Figure 2:
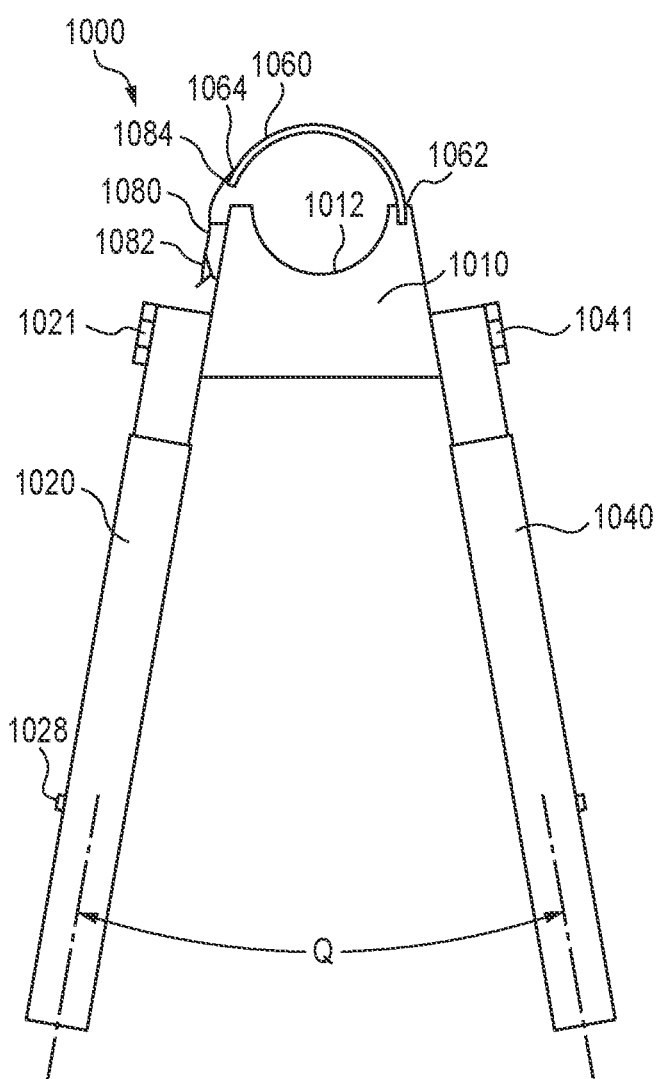
FIG. 2 is an elevational view of the bipod support shown in FIG. 1.
Figure 3:
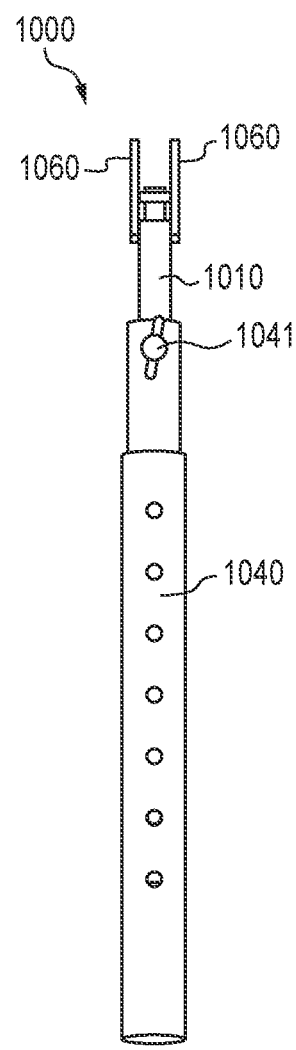
FIG. 3 is a side view of the bipod support shown in FIG. 1.
Figure 4:
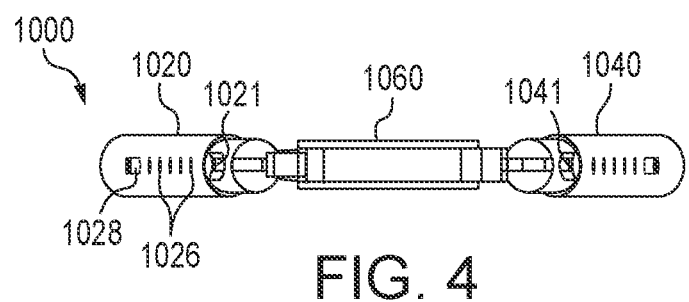
FIG. 4 is a top view of the bipod support shown in FIG. 1.
Figure 8:
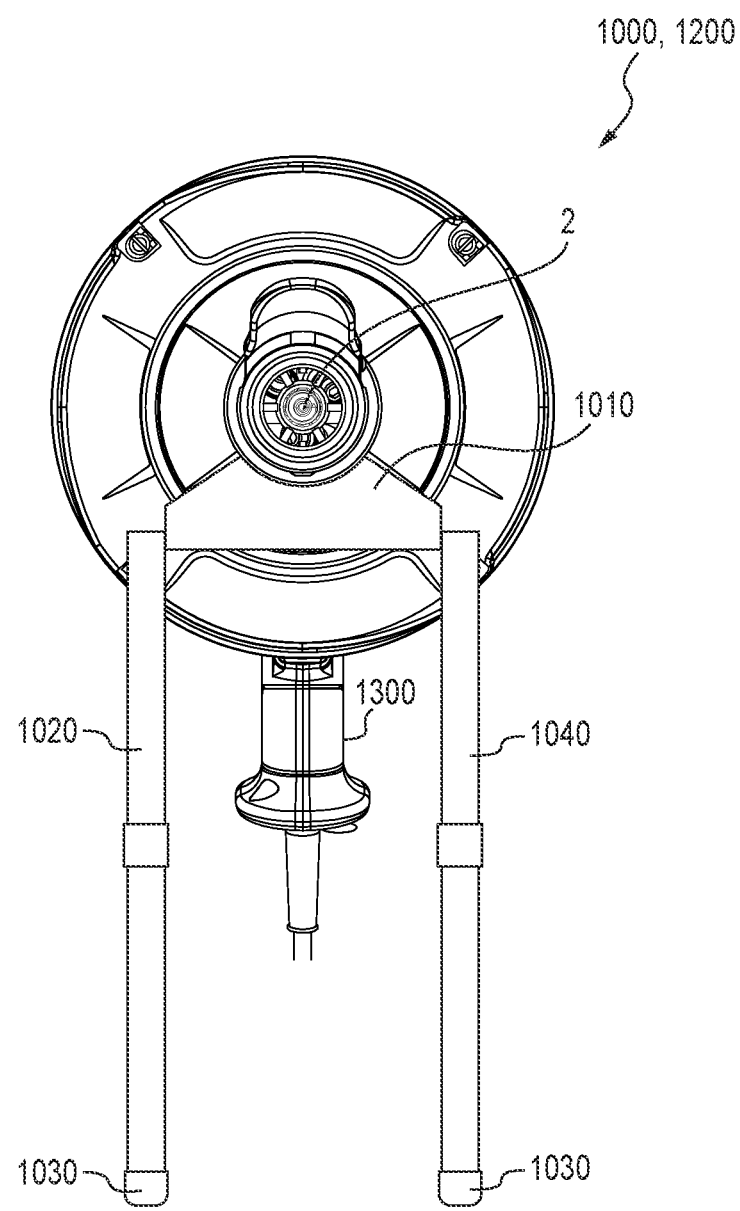
FIG. 8 is a front view of the bipod support and drain cleaning machine shown in FIG. 7.

FIG. 8 is a front view of the bipod support 1000 and the drain cleaning machine 1200 shown in FIG. 7. A portion of the drill 1300 for powering rotation of the drain cleaning cable 2 is also shown. In this orientation and embodiment, the legs 1020 and 1040 extend from the base 1010, parallel to each other, or substantially so. As shown in FIG. 2, in other embodiments, the legs 1020, 1040 extend from the base 1010 in a non-parallel orientation. These aspects relating to leg orientation are with regard to viewing the base 1010 along a line such as the axis C of the drain cleaning cable 2, transverse to the plane A of the base 1010 illustrated in FIG. 7. Thus, it will be understood that the present subject matter includes bipod supports with legs that diverge outward from a base at an angle, as shown in FIG. 2 as angle Q for example, and bipod supports with legs that extend parallel with one another as shown in FIG. 8. In versions of the bipod support having diverging legs, the angle between the diverging legs is typically within a range of from 0° to 180°, and more particularly from 30° to 60°. This angle, i.e., angle Q in FIG. 2, is taken with regard to axes of each leg 1020, 1040.

Figure 9:
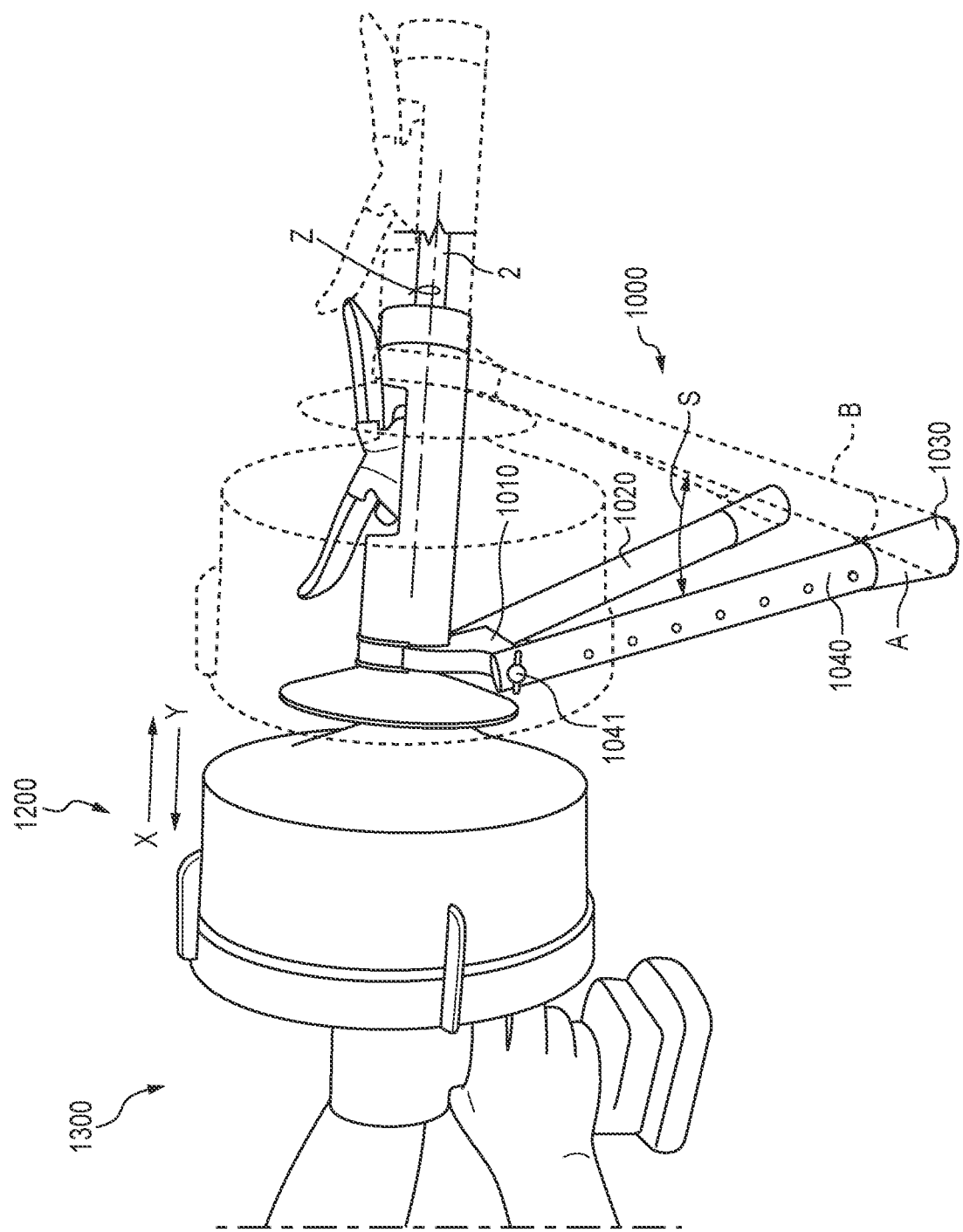
FIG. 9 schematically illustrates another embodiment of a bipod support used with a drain cleaning machine.

FIG. 9 schematically illustrates another embodiment of a bipod support 1000 used with a drain cleaning machine 1200 in accordance with the present subject matter. In this embodiment, the legs 1020 and 1040 are pivotally attached to the base 1010 such that the legs 1020, 1040 enable a user to displace or move the drain cleaning machine 1200 (and drill 1300 if used) and the bipod support 1000 forward and backward, generally in the directions of arrows X and Y, respectively shown in FIG. 9. More specifically, this movement results in the legs 1020, 1040 being pivotally displaced relative to the base 1010 in which leg 1040 is displaced between positions A and B shown in FIG. 9. Leg 1020 is also displaced in a corresponding manner. Typically, this movement results in an angular displacement S of each leg 1020, 1040 within a range of from about 0° to about 140°, and more particularly from 35° to 75°. This angle S as shown in FIG. 9, is taken with regard to an axis of leg 1040 as the leg 1040 moves between positions A and B. Typically, the leg 1020 will also undergo a corresponding angular displacement of angle S. As will be understood, this movement results in a push-and-pull motion along axis Z which typically coincides with a center axis of a forward portion of the drain cleaning machine 1200 and a drain cleaning cable 2 extending therefrom. Moreover, this movement typically also results in axial movement of the drain cleaning cable 2. Furthermore, the noted push-and-pull motion is also typically along a horizontal plane or substantially so. However, it will be understood that the present subject matter is not limited to these aspects and/or movements and instead, the present subject matter encompasses movement of the assembly of the drain cleaning machine 1200 and the bipod support 1000 in other directions and/or along different axes and/or planes. Specifically, FIG. 9 illustrates another aspect of many embodiments of the bipod support 1000 in which one or both legs 1020, 1040 are pivotally connected to the base 1010 such that each leg is not rigidly connected but instead, may be pivotally moved about its fastener. Thus as previously described, the fastener 1041 enables, or is in a state, such that the leg 1040 is pivotally positionable between positions A and B, as the user moves the assembly in the directions X and Y. A similar configuration is used for leg 1020. This configuration enables the bipod support to simultaneously support the weight of the drain cleaning machine and also enable a user to rock the resulting assembly as previously noted to thereby impart a push-and-pull motion to a drain cleaning cable extending from the machine. Typically, each leg is independently movable such that movement of one leg relative to the base does not necessarily result in movement of the other leg. However, the present subject matter includes versions of the bipod support in which the legs are coupled together. For example, the bipod support could include an axle extending between the legs whereby pivotal movement of one leg about its fastener or connection to the base, results in corresponding pivotal movement of the other leg.

The bipod support of the present subject matter can undergo two types of rocking motion in accordance with the present subject matter. In one mode, as depicted in FIG. 9, the legs 1020, 1040 can undergo pivotal movement relative to the base 1010 while the bipod support 1000 (and a drain cleaning machine 1200 supported thereon) is rocked back and forth. In this mode the height as measured between the base 1010 and a surface upon which the bipod support is positioned, remains relatively constant. In another mode, the legs 1020, 1040 are rigidly affixed to the base 1010 and can not undergo pivotal movement. Typically, in this mode, the legs 1020, 1040 extend in a direction parallel with the plane A of the base 1010, as shown in FIG. 7 for example. It will be understood that the legs 1020, 1040 can also be rigidly affixed to the base 1010 at an angle relative to the plane A of the base 1010.

Figure 10:
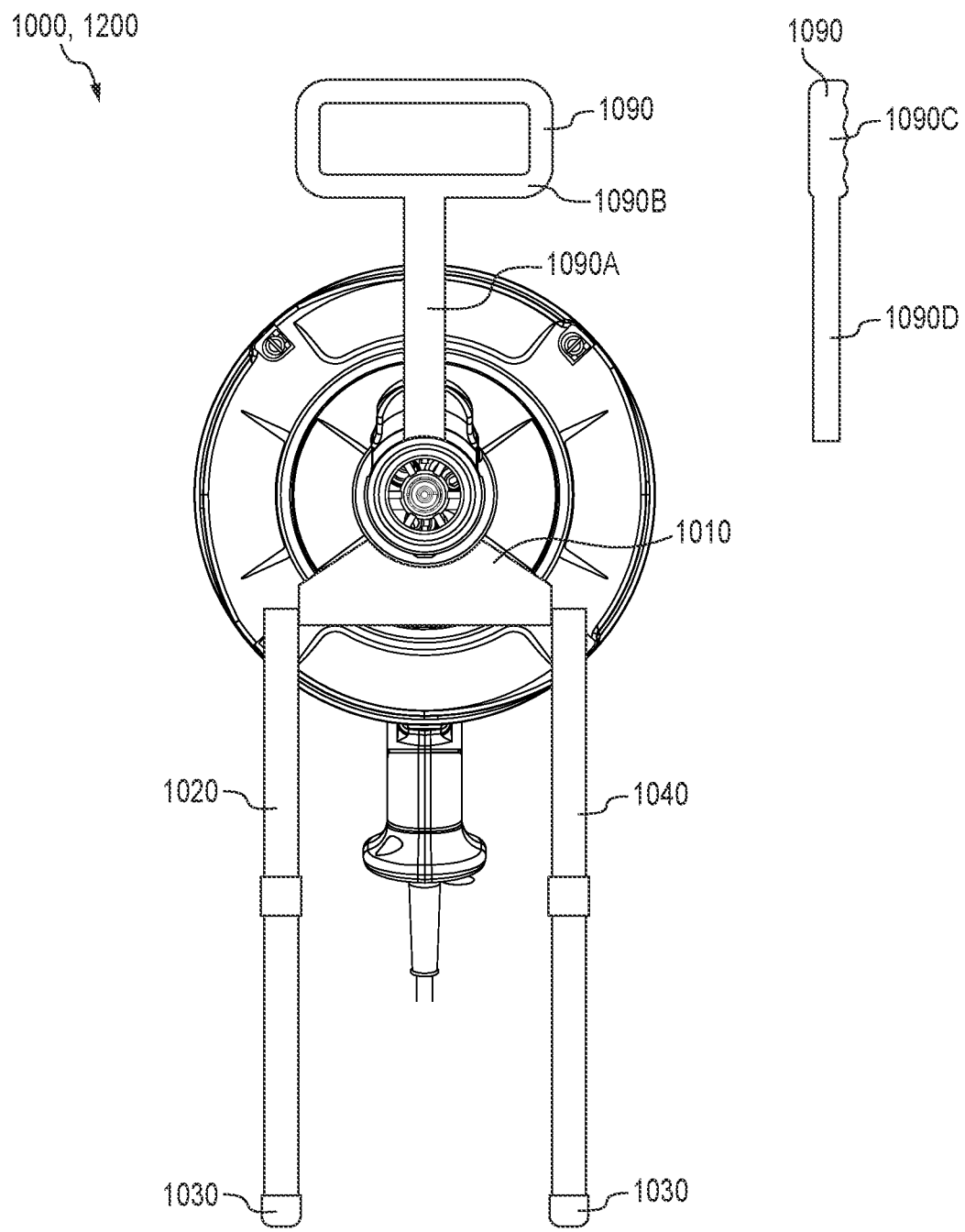
FIG. 10 is a front view of another embodiment of a bipod support and drain cleaning machine in accordance with the present subject matter.

FIG. 10 is a front view of another embodiment of a bipod support 1000 and a drain cleaning machine 1200 in accordance with the present subject matter. In this embodiment, the bipod support 1000 includes a handle 1090 extending from the base 1010. In many versions, the handle 1090 extends in an opposite direction from the direction of the legs 1020, 1040. However, it will be understood that the present subject matter includes a wide array of other and different orientations and extension configurations for the handle 1090. In the particular version depicted in FIG. 10, the handle 1090 includes an extension member 1090A and a gripping member 109013. The extension member 1090A is secured or otherwise attached to the base 1010. However, the present subject matter includes arrangements in which the extension member 1090A is secured to the curved hook 1060 or other components of the bipod support 1000. FIG. 10 also illustrates an alternative configuration for the handle 1090. In this version, the handle 1090 could be in the form of a generally linear member having a gripping member 1090C and an extension member 1090D for attachment to the bipod support 1000, and particularly the base 1010.

Figure 11:
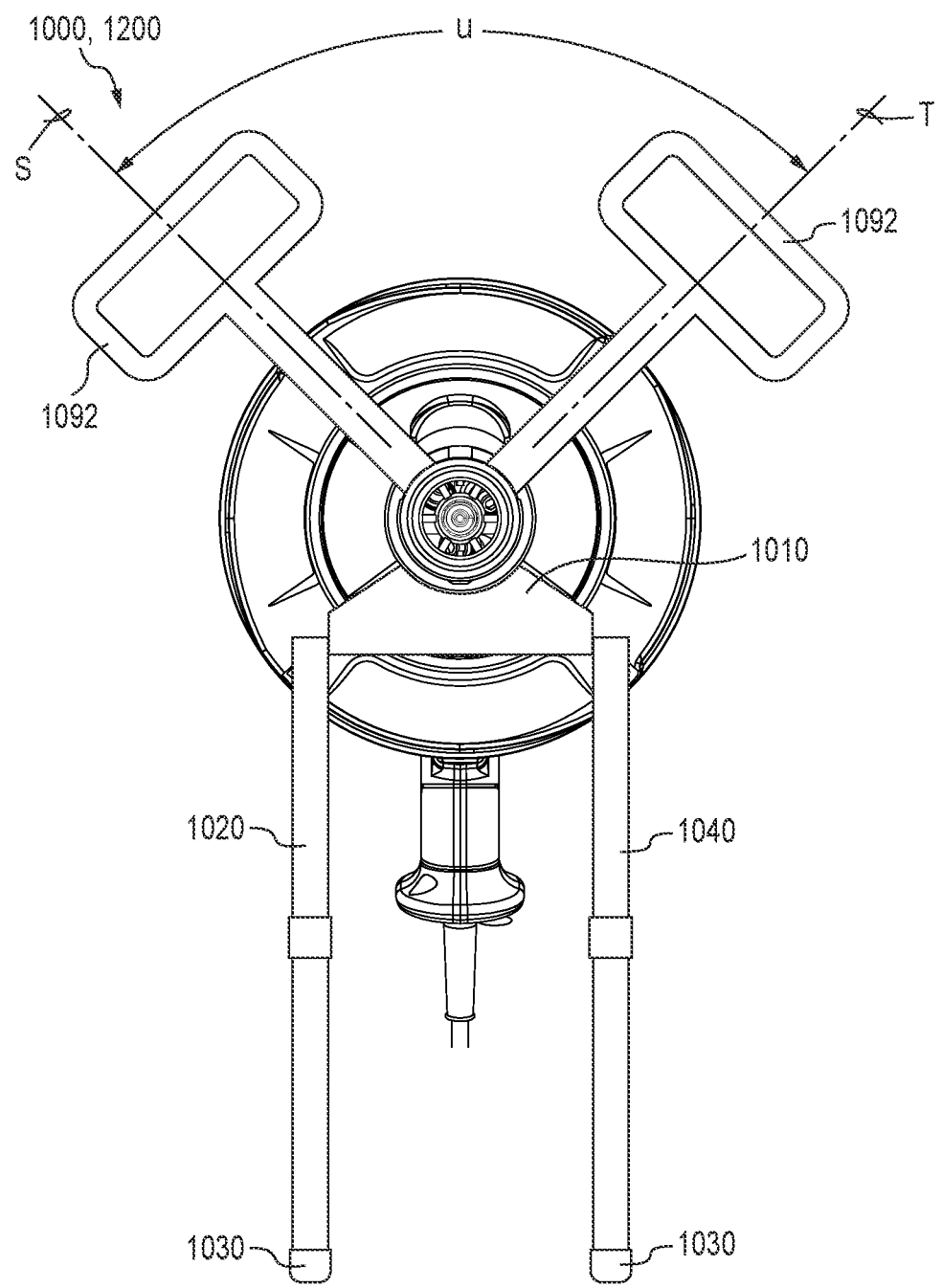
FIG. 11 is a front view of yet another embodiment of a bipod support and drain cleaning machine in accordance with the present subject matter.

FIG. 11 is a front view of another embodiment of a bipod support 1000 and a drain cleaning machine 1200 in accordance with the present subject matter. In this embodiment, the bipod support 1000 includes a plurality of handles such as a pair of handles 1092. The handles 1092 can be configured in like fashion as the previously described handle 1090 shown in FIG. 10. The handles 1092 can be the same or different from each other, in terms of their appearance, construction, and/or configuration. As will be understood, each handle 1092 is secured or attached to the base 1010. In the particular embodiment depicted in FIG. 11, the handles 1092 are oriented such that they extend outward from the base by an angle U as measured between extension axes S and T. Typically, the angle U is within a range of from 10° to about 270°, particularly from 30° to 180°, and more particularly about 90°.

In many embodiments, the bipod support 1000 optionally comprises one or more feet 1030 disposed at distal ends of the legs 1020, 1040. The feet 1030 are typically configured to promote gripping of the bipod support 1000 upon placement on a surface such as a floor or work surface. FIGS. 7-11 illustrate feet 1030 attached at distal ends of the legs 1020, 1040. The feet 1030 can be formed from a variety of materials, however flexible elastomeric or polymeric materials have been found suitable. It is also contemplated to provide feet having particular profiles or geometries along their bottom face, i.e., the face for contacting a floor or work surface. For example, it may be beneficial to use feet having outwardly projecting arcuate surfaces such as a hemispherical surface to promote movement of the bipod support when undergoing the previously described rocking motion. That is, use of such surfaces on the feet avoid disruption of rocking movement and unintentional changes in height of the bipod support that would otherwise occur if flat bottom feet were used and if the legs remained rigidly secured to the base and did not pivot relative to the base while rocking the bipod support. Furthermore, it is also contemplated that feet can be hingedly attached to the legs so that the feet remain in full contact with the support surface as the bipod support is rocked as described herein.

Although the bipod support 1000 is described and illustrated in the referenced figures as using a latch 1080, it will be understood that the present subject matter includes a variety of other closure and/or securement assemblies. For example, other types of latches, locks, hooks, engagement members, ties, fasteners, clasps, buckles, bars, bolts, and hasps could be utilized instead of, or in addition to the latch 1080.

Similarly, a wide array of retaining assemblies or components could be used in the bipod support 1000 instead of, or in addition to, the retaining member or curved hook 1060. For example, one or more flexible members such as cords, ties, elastomeric bands, fabric members, or the like could be used to secure a drain cleaning machine to the base 1010 of the bipod support 1000.

In addition, the present subject matter includes configurations in which the latch 1080 and the retaining member or curved hook 1060 are combined. For example, the present subject matter includes the use of Velcro components, a "peg and hole" assembly, and the like.

Although the bipod support 1000 is described with legs 1020, 1040 that are attached to the base 1010, the present subject matter includes configurations in which one or both legs 1020, 1040 are integrally formed with the base 1010. It is also contemplated that the legs 1020, 1040 can be fixed or formed together and then attached to the base 1010; the legs 1020, 1040 can be fixed or formed together and then attached to a rotating component such as an axle for example, and then attached to the base 1010. It is also contemplated to utilize a push button, detent, or other actuator to enable pivoting of the leg(s) 1020, 1040, relative to the base 1010. This push button, detent, or other actuator can also be configured to engage or secure one or both leg(s) in a particular position relative to the base 1010.

In another aspect, the present subject matter provides a bipod support 1000 and method of use in which an assembly of the bipod support and drain cleaning machine attached thereto is used in a vertical orientation or substantially vertical orientation. In this mode, the legs 1020, 1040 of the bipod support 1000 are positioned parallel with an axis C of the drain cleaning cable 2 as taken proximate a distal end 1202 of a drain cleaning machine secured to the bipod support as also shown in FIG. 7. In many versions of the bipod support the legs 1020, 1040 are positioned transverse to the plane A of the base 1010 such as shown as position B in FIG. 5. And, in this mode, one or both legs 1020, 1040 include biasing members such as compression springs. The assembly is oriented vertically such that a drain cleaning cable extending from the drain cleaning machine is directed toward and into a drain of interest, and the distal ends of the legs are contacted with the floor or work surface adjacent to the drain.

Figure 12:
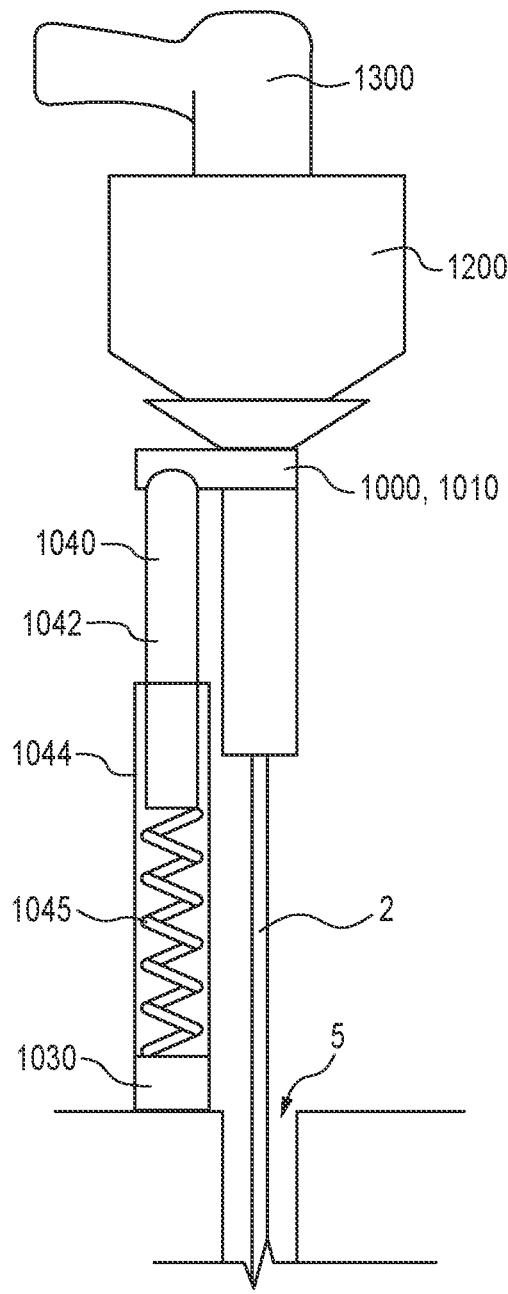
FIGS. 12 and 13 illustrate another embodiment of the bipod support in accordance with the present subject matter.
Figure 13:
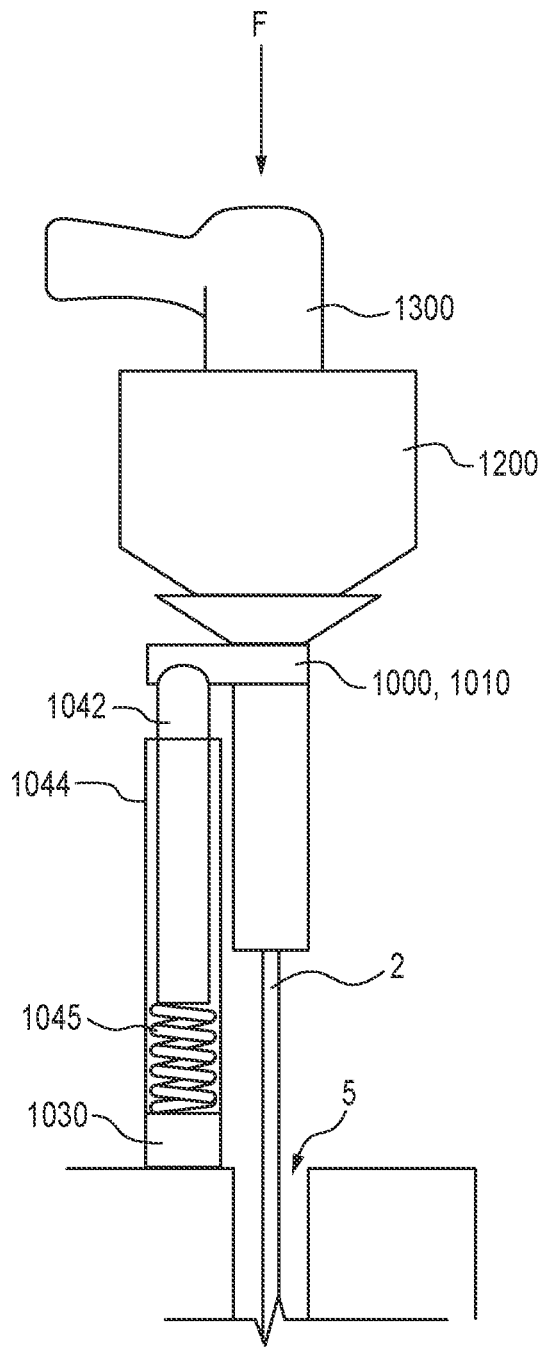

FIGS. 12 and 13 illustrate this embodiment of the bipod support 1000 and its vertical use in association with a drain 5. Specifically, each leg includes one or more compression spring(s) in association with the previously noted telescoping leg assembly. Each leg is configured to vary in length depending upon an amount of axial force applied to the leg. For leg 1040 using a telescoping leg assembly, an inner leg 1042 is connected to the base 1010 and extends into an outer leg 1044. The outer leg 1044 includes a compression spring 1045 in communication with the inner leg 1042. The leg 1020 includes the same or similar configuration. Thus, upon vertically positioning the assembly of the bipod support 1000, the drain cleaning machine 1200, and the electrically powered drill 1300; orienting the legs 1020 (not shown) and 1040 as shown; and contacting feet 1030 with a work surface adjacent the drain 5; the drain cleaning cable 2 is extended from the drain cleaning machine 1200 into the drain 5. Axial movement of the drain cleaning cable 2 is achieved by applying force F to the assembly as shown in FIG. 13. This results in compression of the spring 1045 (and corresponding spring in the other leg) and axial movement of the drain cleaning cable 2 into the drain 5. As will be understood, upon release or removal of force F from the assembly, relaxation and extension of the spring 1045 (and corresponding spring in the other leg) results in axial movement of the drain cleaning cable 2 in an opposite direction, i.e., retraction of the cable 2 from the drain 5.

II. Drain Cleaning Machines and Associated Aspects

A wide array of drain cleaning machines or aspects thereof, can be used in combination with the present subject matter. For example, U.S. Pat. No. 10,233,629 describes drain cleaning machines or plumbing tools with cable movement indicators. Specifically, FIG. 14 of the present disclosure illustrates an embodiment of a plumbing tool 10 with a cable movement indicator assembly as in U.S. Pat. No. 10,233,629. The tool 10 comprises a rotatable drum 20 which can be in the form of a single drum component or include a plurality of drum components. The rotatable drum 20 defines a generally hollow interior 22 in which a drain cleaning cable or "snake" 2 is retained or otherwise stored. The tool 10 also comprises an outer housing 30. The housing 30 and the drum 20 generally define a center axis A, a forward end 12 of the tool 10, and a rearward face 14 of the tool. The face 14 is generally oppositely directed from the forward end 12. The drum 20 and other components described herein are rotatable about the axis A. The drum 20 is typically at least partially supported by the housing 30.

The tool 10 further comprises a rotatable guide tube 40 which generally extends between the hollow interior 22 defined by the drum 20, and the forward end 12 of the tool. The guide tube 40 is rotatably supported within the tool 10 such as by a guide tube support 42 and portions of the drum 20 and housing 30.

As will be understood, the drain cleaning cable 2 extends through the guide tube 40. Upon rotation of the drum 20 and cable 2, and upon activation of a cable feed assembly, cable is either extended from the drum 20, or retracted into the drum 20. A cable feed assembly is described in greater detail herein. As will be understood, actuation of the cable feed assembly translates rotary motion of cable 2 about axis A, to linear axial motion of cable 2 along axis A. A variety of cable feed assemblies are known in the art such as those described in US 2016/0175899; U.S. Pat. Nos. 6,158,076; 6,412,136; and 7,367,077 for example, all assigned to Applicant. The remaining reference numerals in FIG. 14 herein are described in the noted U.S. Pat. No. 10,233,629.

Figure 15:
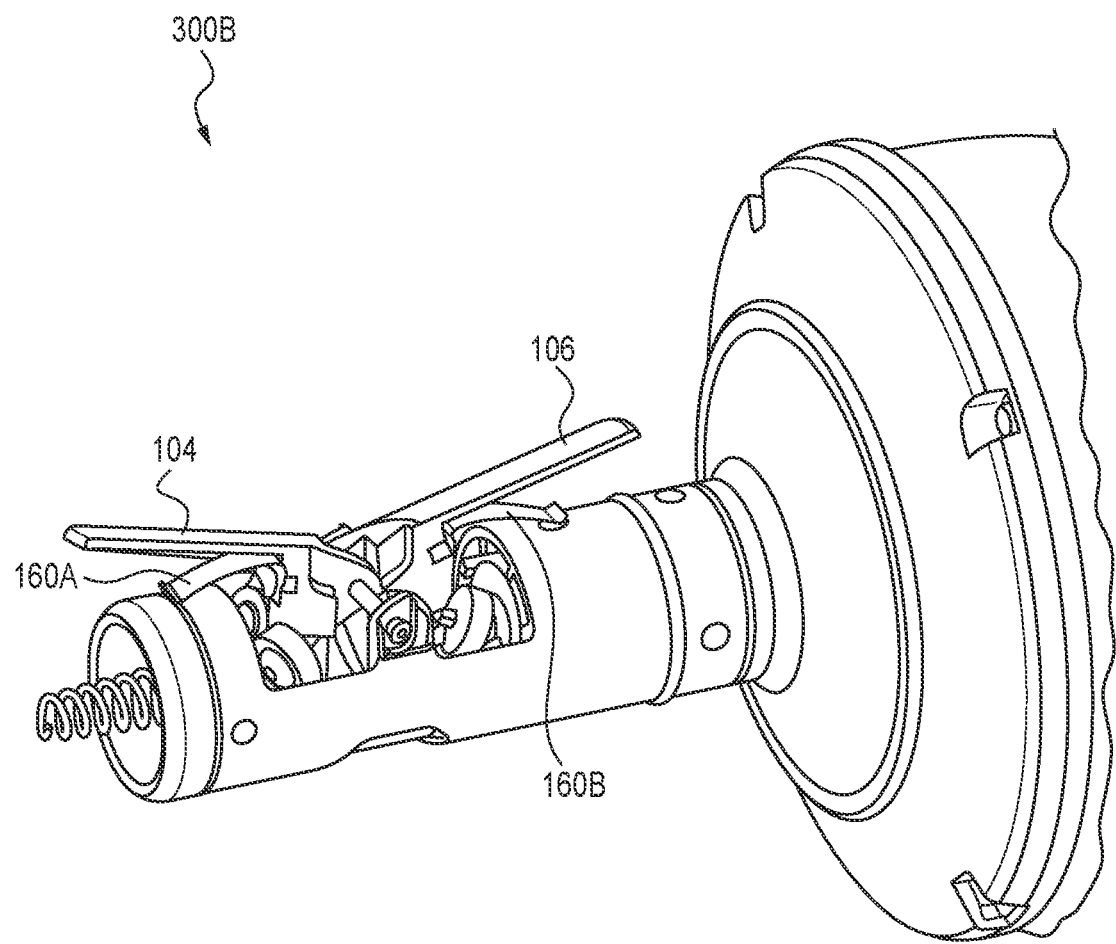
FIG. 15 is a partial schematic perspective view of a feed control device used with a drain cleaning machine and potentially with the present subject matter.

FIG. 15 herein illustrates an embodiment 300B of a feed control device which is described in U.S. Pat. No. 10,071,401. The roller assemblies of the feed control device 300B utilize the same roller assemblies as described in U.S. Pat. No. 7,685,669. Specifically, FIG. 15 illustrates a pair of paddles 104 and 106. The paddles 104 and 106 and their operation are described in the noted '669 patent. As described in the '669 patent, upon pressing on either of the paddles 104, 106, the other paddle will retract or no longer contact a drain cleaning cable. The device 300B includes one or more biasing members 160A and 160B which urge the paddles 104, 106 to an intermediate or center position, corresponding to no cable extension or retraction.

U.S. Pat. No. 7,685,669 describes various feed control devices that can be used in combination with the present subject matter. In the embodiment illustrated in FIGS. 1-5 of U.S. Pat. No. 7,685,669, actuator 14 includes a central mounting portion 26 extending downwardly therefrom and having axially opposite ends, not designated numerically, upon which rolls 22b and 22c of roll set 22 and rolls 24b and 24c of roll set 24 are mounted. Mounting portion 26 includes a pair of downwardly extending trunnions 28 between the axially opposite ends thereof and which are spaced apart relative to axis B to receive a rib 30 on base 12 therebetween. Trunnions 28 are provided with pin openings 32 aligned with a pin opening 34 in rib 30 and a pin opening 36 in one of the laterally opposite sides of base 12. Pivot pin 16 extends through an elongate opening 37 in the other of the sides and through openings 32, 34 and 36 to removably mount actuator 14 on base 12. One of the outer ends of pin 16 is provided with barbs 38 which frictionally engage in opening 32 in the adjacent trunnion 28 to removably hold the pin in place. Removability of the pin is desired in connection with separating actuator 14 from base 12 to facilitate introducing a bulb auger on the end of a snake through the feeding device. The outer ends of actuator legs 18 and 20 are provided with openings 18a and 20a therethrough which provide tool access to the corresponding one of the rolls 22b and 24b on the actuator.

Figure 16:
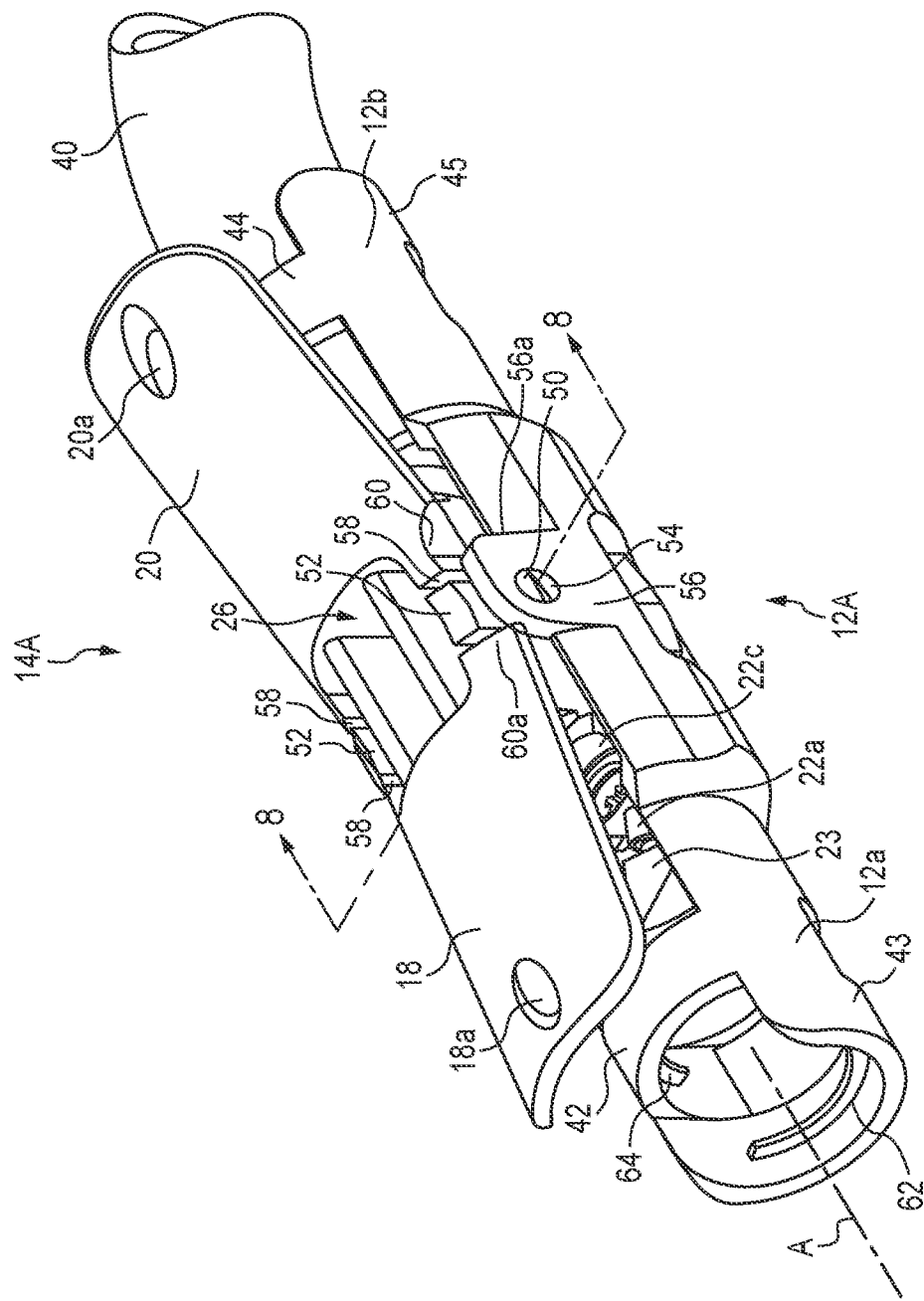
FIG. 16 is a schematic perspective view of another feed control device that can be used in combination with the present subject matter.

FIG. 16 herein illustrates a modification of the mounting arrangement of the actuator from that shown in FIGS. 1-5 in U.S. Pat. No. 7,685,669. With the exception of the mounting arrangement, the other component parts of the device are the same as those in the embodiment of FIGS. 1-5 of U.S. Pat. No. 7,685,669 and, accordingly, are designated by like numerals. In the embodiment of FIG. 16 herein, pivot pin 16 is replaced by posts 50 extending laterally outwardly from flexible tabs 52 on the laterally opposite sides of actuator 14A and which posts are pivotally received in openings 54 in trunnions 56 on laterally opposite sides of base 12A. More particularly in this respect, side walls 26a of mounting portion 26 of actuator 14A are each provided with a pair of axially spaced apart vertical slots 58 which define the corresponding tab 52 and which, because of these slots, is adapted to be displaceable laterally inwardly of the corresponding trunnion 56 to disengage actuator 14A from base 12A. Accordingly, it will be appreciated that a user can squeeze tabs 52 laterally inwardly relative to one another in order to remove the actuator which, as in the embodiments of FIGS. 1-5 of U.S. Pat. No. 7,685,669, facilitates feeding a bulb auger on the end of a snake through the device. The lower ends of posts 50 are provided with camming surface 50a which engage the upper ends of trunnions 56 to displace the tabs inwardly during remounting of the actuator to facilitate the remounting. Preferably, openings 54 are offset toward one of the axially opposite sides of the corresponding trunnion and the area of juncture between legs 18 and 20 of the actuator is provided with radially inwardly extending slots 60 profiled to preclude mounting of actuator 14A on base 12A other than in the orientation shown in FIG. 16, herein. This, of course, assures that the rolls in each of the roll sets are canted in the same direction. In this respect, if a user or operator attempted to mount actuator 14A on base 12A in the orientation opposite that shown in FIG. 6 of U.S. Pat. No. 7,685,669, edges 60A of recesses 60 would engage vertical edge 56A of trunnions 56 to preclude the necessary alignment between posts 50 and openings 54 in the trunnions. The remaining reference numerals in FIG. 16 herein are described in the noted U.S. Pat. No. 7,685,669.

Figure 14:
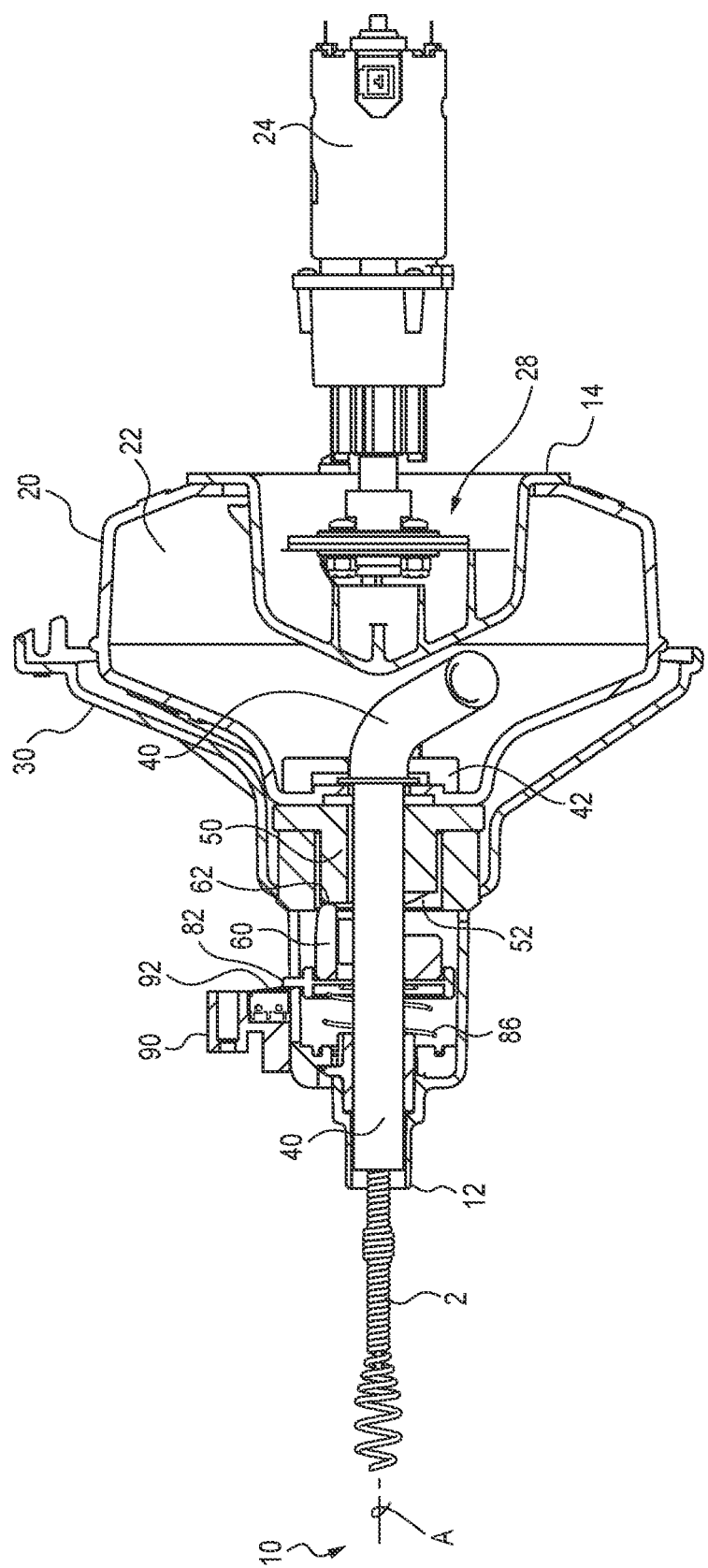
FIG. 14 is a schematic cross-sectional view of a drain cleaning machine and various aspects that can be used in combination with the present subject matter.

FIGS. 14-16 of U.S. Pat. No. 7,685,669 illustrate a further embodiment of a snake or cable feeding device. In this embodiment, the feeding device 100 comprises a base member 102 having an axis A and axially opposite ends 102a and 102b, and an actuator defined by first and second actuator members 104 and 106, respectively. The actuator members are pivotally mounted on base 102 as set forth more fully hereinafter and extend axially outwardly in opposite directions from a location generally centrally between the opposite ends of base 102 to a location outwardly of the corresponding end of the base. The feeding device further includes first and second sets of drive rolls 108 and 110, respectively, defined by single drive rolls 108a and 110a respectively mounted on end 102a and end 102b of the base, and pairs of drive rolls 108b and 108c and 110b and 110c respectively mounted on actuator members 104 and 106 as set forth hereinafter.

Base 102 has laterally spaced apart upstanding mounting plates 112 and 113, and actuator members 104 and 106 have axially inner ends 104a and 106a, respectively, which overlap as described hereinabove in connection with the embodiment of FIGS. 9-13 of U.S. Pat. No. 7,685,669, and the overlapping portions and mounting plates 112 and 113 are provided with laterally aligned openings, not designated numerically, for receiving a pin 114 by which the actuators are pivotally engaged with base 102. Actuator 104 is provided on the underside thereof at inner end 104a with drive rolls 108b and 108c in overlying relationship with drive roll 108a of roll set 108, and the underside of actuator 106 at inner end 106a thereof is provided with drive rolls 110b and 110c which overlie drive roll 110a of roll set 110. As described herein with regard to the embodiment in FIGS. 9-13 of U.S. Pat. No. 7,685,669, the axially overlapping inner ends of actuator members 104 and 106 provide a tongue component defined by a pair of fingers which are laterally spaced apart to receive a biasing spring 116 therebetween, which spring surrounds pin 114 and has opposite ends 116a and 116b extending axially outwardly into engagement with actuator members 104 and 106, respectively, so as to bias each of the actuator members downwardly toward base 102. As will be appreciated from FIG. 16 of U.S. Pat. No. 7,685,669, the axially overlapping inner ends of actuators 104 and 106 have interengaging finger and shoulder elements 118 and 120, respectively, which interengage to limit pivotal movement of the actuators toward base 102. Thus, as will be further appreciated from FIG. 16 of U.S. Pat. No. 7,685,669, the finger and shoulder elements interengage so as to provide a space between the upper and lower rolls of the corresponding roll set which is sufficient for a snake to pass therebetween and rotate relative to the roll sets without being axially driven thereby. As mentioned herein, in connection with the embodiment of FIGS. 9-13 of U.S. Pat. No. 7,685,669, such positional relationship between the rolls of the roll sets provides a neutral position with respect to driving or feeding the snake relative to the device.

Further in accordance with the embodiment of FIGS. 14-16 of U.S. Pat. No. 7,685,669, feeding device 100 is adapted to be removably mounted in a housing 122 which, preferably, is circular in cross-section and has an axis which is coaxial with axis A of the feeding device when the latter is mounted therein. More particularly, housing 122 has axially opposite ends 122a and 122b axially outwardly of ends 102a and 102b of base 102, respectively, and the housing has an open portion 124 between the ends thereof which is adapted to receive base 102 of the feeding device in a manner whereby actuator members 104 and 106 extend outwardly of the open portion. Housing 122 includes a wall 126 opposite open portion 124, and base member 102 and thus feeding device 100 is removably attached to wall 126 by means of a threaded fastener 128 extending through an opening therefor in wall 126, not designated numerically, and into a threaded bore 130 in the bottom of base member 102. The removability of feeding device 100 from housing 122 advantageously facilitates access to the drive roll components as well as the base and actuator members for the purpose of cleaning, replacement or the like. In this embodiment, end 122a of the housing is provided with an annular snake guide component 132 which is received in end 122a and removably secured therein by threaded fasteners 134 and which includes a central opening 136 therethrough for receiving a snake. End 122b of housing 122 is provided with a suitable arrangement for attaching the housing to an associated device. The attaching arrangement can be of any desired structure for attaching the housing to an associated device and, for example, can be structured as shown in the embodiments of FIGS. 1-13 of U.S. Pat. No. 7,685,669 for attachment to a guide tube. In the embodiment illustrated in FIGS. 14-16 of U.S. Pat. No. 7,685,669, the attachment arrangement is defined by axially extending recesses 138 extending axially inwardly from end 122b of the housing and terminating in slots 140 opening outwardly of the housing. This arrangement facilitates mounting the feeding device, for example, on the snake guide tube extending forwardly of the drum of a motor driven, handheld drain cleaner of the character referred to at the outset hereof.

Figure 1:
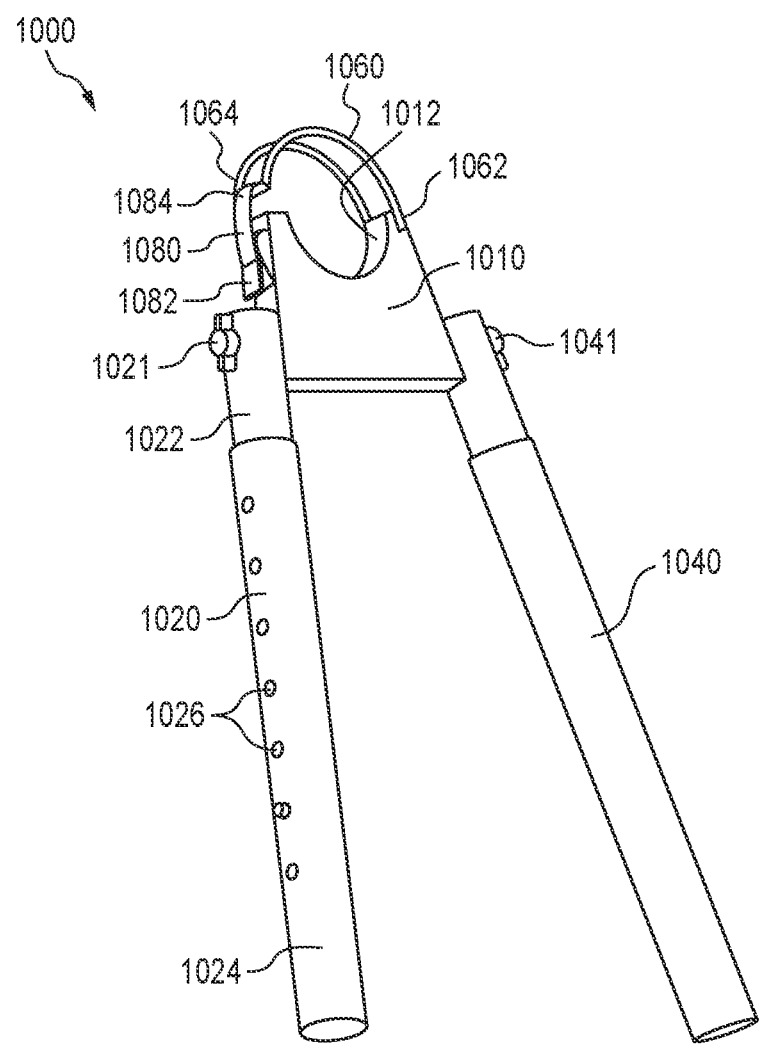
FIG. 1 is a perspective view of an embodiment of a bipod support in accordance with the present subject matter.
Figure 17:
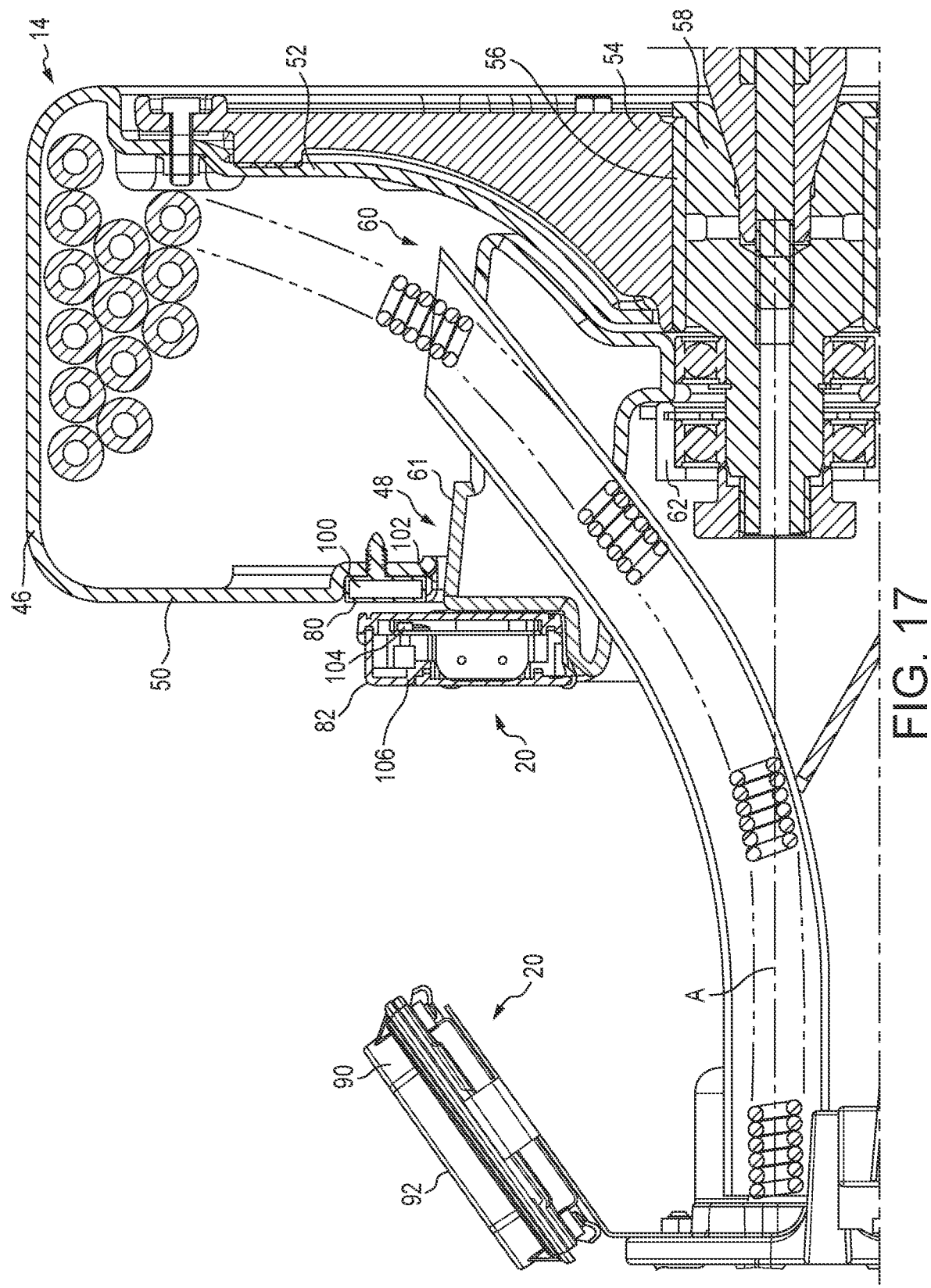
FIG. 17 is a schematic partial cross-sectional view of a drain cleaning machine and various aspects that can be used in combination with the present subject matter.

U.S. Pat. No. 8,176,593 describes various drain cleaning machines with electronic cable monitoring systems that can be used in combination with the present subject matter. As best seen in FIGS. 1 and 2 of U.S. Pat. No. 8,176,593 and FIG. 17 herein, the cable drum unit 14 includes a drum housing 46 having an opening 48 in a front wall 50 thereof and having its rear wall 52 contoured to receive a hub member 54 to which the housing is secured by means of a plurality of suitable fasteners or the like. The drum unit 14 further includes a hollow drum shaft 56 carried on an elongate member 58 secured to the frame 12 by which the drum shaft 56 and drum assembly 14 are rotatable about an axis defined by the elongate member 58. A cable follower member 60 preferably in the form of an inner drum 61 is secured to the outer end of the elongate member 58 for rotational displacement about its axis by means of a suitable mounting bracket 62 or the like using suitable bearings and fasteners. As is well known, the drum housing 46 holds the non-used section of the coiled cable member 24, and the cable follower member 60 serves to guide displacement of the cable into and out of the opening 48 and drum housing 46 while operating the drain cleaning apparatus 10 and in a manner which provides for the cable to be coiled and uncoiled during its displacement relative to the housing. While the cable follower member 60 is illustrated and described herein as being a part of the drum unit, this is merely a preferred arrangement and the guide tube could be supported adjacent its axially outer end for rotation, in which case it would be free of a mounted interconnection with the drum unit. The remaining reference numerals in FIG. 17 herein are described in the noted U.S. Pat. No. 8,176,593.

As described herein, the present subject matter bipod support can be used with a wide array of drain cleaning machines. Typically, the bipod support is utilized with a drain cleaning machine that is dimensioned and configured to be hand-held. And, as will be understood, typically the drain cleaning machine includes a cylindrical housing portion or a sleeve disposed on or about an exterior surface of a forward end portion of the housing. Typically, the curved hook and the base of the bipod support are configured to circumferentially engage the noted housing portion or sleeve.

In many embodiments and/or applications, the bipod support is used with a drain cleaning machine having a cable feed control device. Typically, the cable feed control device is disposed along a forward end portion of the drain cleaning machine housing. The cable feed control device serves to enable control of extending the cable from the drain cleaning machine as well as retracting the cable from the drain cleaning machine. A typical cable feed control device is shown in FIGS. 7 and 9 herein as 1250.

In many embodiments and/or applications, the bipod support is used with a drain cleaning machine having a drain cleaning cable. Typically, the drain cleaning cable is stored or otherwise retained within the drain cleaning machine. As previously described herein, the drain cleaning machine typically includes a rotatable drum. The drain cleaning cable is coiled within the interior region of the drum. This aspect is depicted in FIG. 7 herein in which a drain cleaning cable 2 is shown extending from a forward end of the drain cleaning machine 1200. A majority portion of the cable 2 is coiled within the drum of the drain cleaning machine 1200.

The present subject matter bipod supports can be used with sectional drain cleaning machines. It is also contemplated that the bipod supports could be used with handheld sectional drain cleaning machines.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

The invention claimed is:

1. A drain cleaning machine comprising:
a housing;
a drum rotatable about an axis;
a cable including an operative end portion that is extendable from and retractable into the drum;
a support pivotally attached to the housing for moving the drain cleaner between a first position spaced a first distance from a drain and a second position spaced a second distance from the drain, the second distance being shorter than the first distance;
whereupon the operative end portion of the cable, disposed in the drain, is extended and retracted relative to the drain, when the drain cleaner is moved between the first and second positions.

2. The drain cleaning machine of claim 1 wherein the support comprises:
a base configured to support the drain cleaning machine; and
a pair of legs, wherein each leg is pivotally connected to the base for moving the base between the first position and the second position.

3. The drain cleaning machine of claim 2 wherein the legs of the support are adjustable in length for enabling the base of the support to be adjustable in height relative to a surface on which the support is positioned.

4. The drain cleaning machine of claim 2 wherein the support further comprises:
a hook having opposite end portions, a first end portion of the hook being pivotally connected to the base.

5. The drain cleaning machine of claim 4 wherein the support further comprises:
a latch having opposite end portions, wherein a first end portion of the latch is removably secured to the base and wherein a second end portion of the latch is fixed to a second end portion of the hook, opposite the first end portion of the hook.

6. The drain cleaning machine of claim 5 wherein the hook and base are configured to engage the exterior surface of the housing when the first end portion of the latch is secured to the base.

7. The drain cleaning machine of claim 1 wherein the drain cleaning machine is dimensioned and configured to be hand-held.

8. The drain cleaning machine of claim 1 wherein the drain cleaning machine further comprises a sleeve mounted on an exterior surface portion of a forward end portion of the housing.

9. The drain cleaning machine of claim 8 wherein the drain cleaning machine further comprises a feed control device for extending the cable from the housing and retracting the cable back into the housing.

10. The drain cleaning machine of claim 1 wherein the cable is coiled within an interior region of the drum.

11. In combination with a drain cleaning machine, a bipod support removably secured to the drain cleaning machine, wherein the drain cleaning machine comprises:
- a housing defining a hollow forward end portion and a preselected exterior surface configuration for the forward end portion of the housing;
- a drum rotatable about an axis; and
- a cable including an operative end portion that is extendable from and retractable into the drum; and
- wherein the bipod support comprises:
- a base configured to support the drain cleaning machine; and
- a pair of legs, wherein each leg is pivotally connected to the base for moving the base between a first position spaced from a drain and a second position closer to the drain than the first position;
- wherein the drain cleaning machine, when secured to the base, is movable between the first and second positions relative to the drain, whereupon the operative end portion of the cable, disposed in the drain, is extended and retracted relative to the drain, when the base is moved between the first and second positions.

12. The combination of claim 11, wherein the drain cleaning machine is dimensioned and configured to be hand-held.

13. The combination of claim 11, wherein the drain cleaning machine further comprises a sleeve mounted on an exterior surface portion of the forward end portion of the housing.

14. The combination of claim 13, wherein the drain cleaning machine further comprises a feed control device for extending the cable from as well as for retracting the cable back into the forward end portion of the housing.

15. The combination of claim 11, wherein the cable is coiled within an interior region of the drum.

16. The combination of claim 11, wherein the legs of the bipod support are adjustable in length for enabling the base of the bipod support to be adjustable in height relative to a surface on which the bipod support is positioned.

17. The combination of claim 11 wherein the bipod support further comprises:
- a hook having opposite end portions, a first end portion of the curved hook being pivotally connected to the base.

18. The combination of claim 17 wherein the bipod support further comprises:
- a latch having opposite end portions, wherein a first end portion of the latch is removably secured to the base and wherein a second end portion of the latch is fixed to a second end portion of the curved hook, opposite the first end portion of the hook.

19. The combination of claim 18 wherein the hook and base are configured to engage the exterior surface of the housing forward end portion when the first end portion of the latch is secured to the base.

* * * * *